United States Patent
Absillis et al.

(10) Patent No.: US 7,646,713 B1
(45) Date of Patent: Jan. 12, 2010

(54) METHOD AND ACCESS NODE CONFIGURED FOR PROVIDING INTELLIGENT CROSS CONNECTION FUNCTIONALITY

(75) Inventors: Luc Absillis, Raleigh, NC (US); Robert McIntosh, Carp (CA)

(73) Assignee: Alcatel Lucent, Paris (FR)

( * ) Notice: Subject to any disclaimer, the term of this patent is extended or adjusted under 35 U.S.C. 154(b) by 519 days.

(21) Appl. No.: 11/244,969

(22) Filed: Oct. 6, 2005

(51) Int. Cl.
*H04L 12/26* (2006.01)
*H04L 12/66* (2006.01)

(52) U.S. Cl. ............... 370/230.1; 370/235; 370/401

(58) Field of Classification Search ......... 370/230.1, 370/252, 253, 254, 255, 356, 357, 395.21, 370/235, 401
See application file for complete search history.

(56) References Cited

U.S. PATENT DOCUMENTS

| | | | |
|---|---|---|---|
| 6,396,837 B1 * | 5/2002 | Wang et al. | 370/395.21 |
| 6,904,265 B1 * | 6/2005 | Valdivia et al. | 455/12.1 |
| 7,174,018 B1 * | 2/2007 | Patil et al. | 713/153 |
| 7,366,147 B2 * | 4/2008 | O'Neill | 370/338 |
| 2003/0123446 A1 * | 7/2003 | Muirhead et al. | 370/400 |
| 2005/0160180 A1 * | 7/2005 | Rabje et al. | 709/238 |
| 2005/0180440 A1 * | 8/2005 | Perrot et al. | 370/401 |
| 2006/0184645 A1 * | 8/2006 | Monette et al. | 709/218 |

* cited by examiner

*Primary Examiner*—Alpus H Hsu
(74) *Attorney, Agent, or Firm*—Galasso & Associates

(57) ABSTRACT

An access node comprises an access port configured for operating in a semi-transparent mode. The semi-transparent mode provides for 1:1 between a logical circuit on a network interface of the access node and a logical circuit on an access loop between the access port and customer premise equipment (CPE). The 1:1 mapping enables manipulation of subscriber traffic at the access port on a per-subscriber basis while maintaining logical separation of per-subscriber traffic.

20 Claims, 1 Drawing Sheet

METHOD AND ACCESS NODE CONFIGURED FOR PROVIDING INTELLIGENT CROSS CONNECTION FUNCTIONALITY

FIELD OF THE DISCLOSURE

The disclosures made herein relate generally to broadband access nodes and, more particularly, to logical connectivity models supported by broadband access nodes.

BACKGROUND

The data flow of different sources (e.g., several users, several services or several terminals) must be combined and connected in an efficient way in order to perform access and aggregation tasks. Currently, broadband access nodes connected to an Ethernet aggregation network typically support two main logical connectivity models (i.e., conventional connectivity models). These two conventional connectivity models are aggregation model and transparent cross connection model.

In aggregation mode, a broadband access node combines the traffic from multiple subscribers or logical channels on a subscriber's loop onto 1 or more logical identifiers in an aggregation network. Typically, a per-service logical identifier, for instance a Virtual Local Area Network (VLAN), is used on the Ethernet aggregation network. Consolidating traffic can be achieved at Layer 2 (i.e., the Data Link Layer) through a bridging function or at Layer 3 (i.e., the Network Layer) through Internet Protocol (IP) forwarding function. This aggregation mode allows for a very efficient multicast infrastructure and the implementation of per-subscriber security and traffic policing at the aggregation or services edge of the network.

However, combining traffic from multiple subscribers through such an aggregation mode at the access node requires that certain function be enabled at the access node. Examples these functions include, but are not limited to, enforcement of per-subscriber security policies, enforcement of per-subscriber traffic/Quality of Service (QoS) policies, generation of billing records and lawful intercept of information. The aggregation mode of operation forces these functions to be further distributed into the broadband access node. Traditionally, a Broadband Remote Access Aggregation Server (BRAS) or Edge Router in a network has performed these functions by adding a session-based protocol to identify a subscriber and enforce policies In transparent cross connect mode, a broadband access node does not consolidate traffic from multiple subscribers or logical channels on a subscriber's loop. The broadband access node performs a direct transparent forwarding of the data from the subscriber's logical channel to a VLAN identifier on the Ethernet aggregation link. The combination of traffic of different subscribers in this mode is performed by more centrally-located network nodes. Accordingly, this model allows for per-subscriber security and traffic policies to be enforced by a centralized network node but not by the access node itself.

When operating in transparent cross connection mode, the broadband access node performs a transparent mapping of a local loop logical circuit to a unique VLAN identifier on the aggregation link. Because of this transparent mapping, no traffic in the access node is consolidated and, thus, allowing for this consolidation functionality to remain in the BRAS or Edge Router. Furthermore, when cross connectivity is facilitated in a transparent manner, the broadband access node cannot become a replication point for multicast traffic, cannot filter packets, cannot change the order of packets, cannot insert packets in the data stream and cannot enforce per-subscriber policies or security policies (e.g., enforcement of per-subscriber security policies, enforcement of per-subscriber traffic/QoS policies, generation of billing records and lawful intercept of information).

Therefore, implementation of cross connection functionality in an access node in a manner that overcomes limitations associated with conventional approaches for implementing cross connection functionality in an access node is useful and advantageous.

SUMMARY OF THE DISCLOSURE

Embodiments of the present invention provide for cross connect like deployment that enable advantageous traffic management functionality. Examples of such traffic management functionality include, but are not limited to, advanced per-subscriber security and traffic policies enforced by a relatively centralized network node, multicast efficiency by replicating streams in the access node and deeper in an associated network and access node specific per-subscriber security policies.

To this end, cross connect functionality in accordance with the present invention enables an access node to operate in a semi-transparent mode. By operating in the semi-transparent mode, the present invention allows for active involvement in multicast traffic replication, enforce subscriber specific traffic policies, control plane operations and access node specific security policies. Accordingly, implementation of cross connection functionality in an access node in accordance with the present invention enables an optimized architecture with advanced per-subscriber policy functions more centralised in the network while introducing multicast efficiency, policy enforcement options and access node security policies. Such an implementation overcomes limitations associated with conventional approaches for implementing cross connection functionality in an access node.

In one embodiment of the present invention, an access node comprises an access port configured for operating in a semi-transparent mode. The semi-transparent mode provides for 1:1 mapping between a logical circuit on a network interface of the access node and a logical circuit on an access loop between the access port and customer premise equipment (CPE). The 1:1 mapping enables manipulation of subscriber traffic at the access port on a per-subscriber basis while maintaining logical separation of per-subscriber traffic.

In another embodiment of the present invention, an access node comprises an access port configured for operating in a semi-transparent mode. The semi-transparent mode provides for 1:1 mapping between a logical circuit on a network interface of the access node and a logical circuit on an access loop between the access port and customer premise equipment (CPE). The access port is configured for providing traffic management functionality including at least one of subscriber authentication functionality, control message handling functionality, Dynamic Host Configuration Protocol (DHCP) message handling functionality, multicast group behavior functionality and Point-to-Point Protocol (PPP) message handling functionality. The 1:1 mapping enables manipulation of subscriber traffic that is required implementing per subscriber traffic management functionality.

In another embodiment of the present invention, a method comprises providing 1:1 mapping between a logical circuit on a network interface of the access node and a logical circuit on an access loop between the access port and customer premise equipment (CPE). Subscriber traffic traverses the access node via the access loop. The method further comprises performing traffic management functionality on the subscriber traffic in conjunction with the subscriber traffic traversing the access node. The 1:1 mapping enables manipulation of subscriber traffic that is required implementing per subscriber traffic management functionality.

Turning now to specific aspects of the present invention, in at least one embodiment, the access port is configured for providing traffic management functionality and the 1:1 mapping enables manipulation of subscriber traffic that is required for performing the traffic management functionality.

In at least one embodiment of the present invention, accessing of control plane messages traversing the access port is provided for.

In at least one embodiment of the present invention, enforcing of port level security policy is provided for.

In at least one embodiment of the present invention, dynamic adjustment of multicast forwarding tables in response to accessing Internet Group Message Protocol (IGMP) messages traversing the access port is provided for.

In at least one embodiment of the present invention, performing packet replication in per subscriber logical circuits on an access loop between the access node and customer premise equipment (CPE) for multicast streams in conjunction with dynamically adjusting the multicast forwarding tables is provided for.

In at least one embodiment of the present invention, traffic management functionality includes subscriber authentication functionality, control message handling functionality, Dynamic Host Configuration Protocol (DHCP) message handling functionality, multicast group behavior functionality and/or Point-to-Point Protocol (PPP) message handling functionality These and other objects, embodiments, advantages and/or distinctions of the present invention will become readily apparent upon further review of the following specification, associated drawings and appended claims.

DETAILED DESCRIPTION OF THE DRAWING FIGURES

Figure 1:
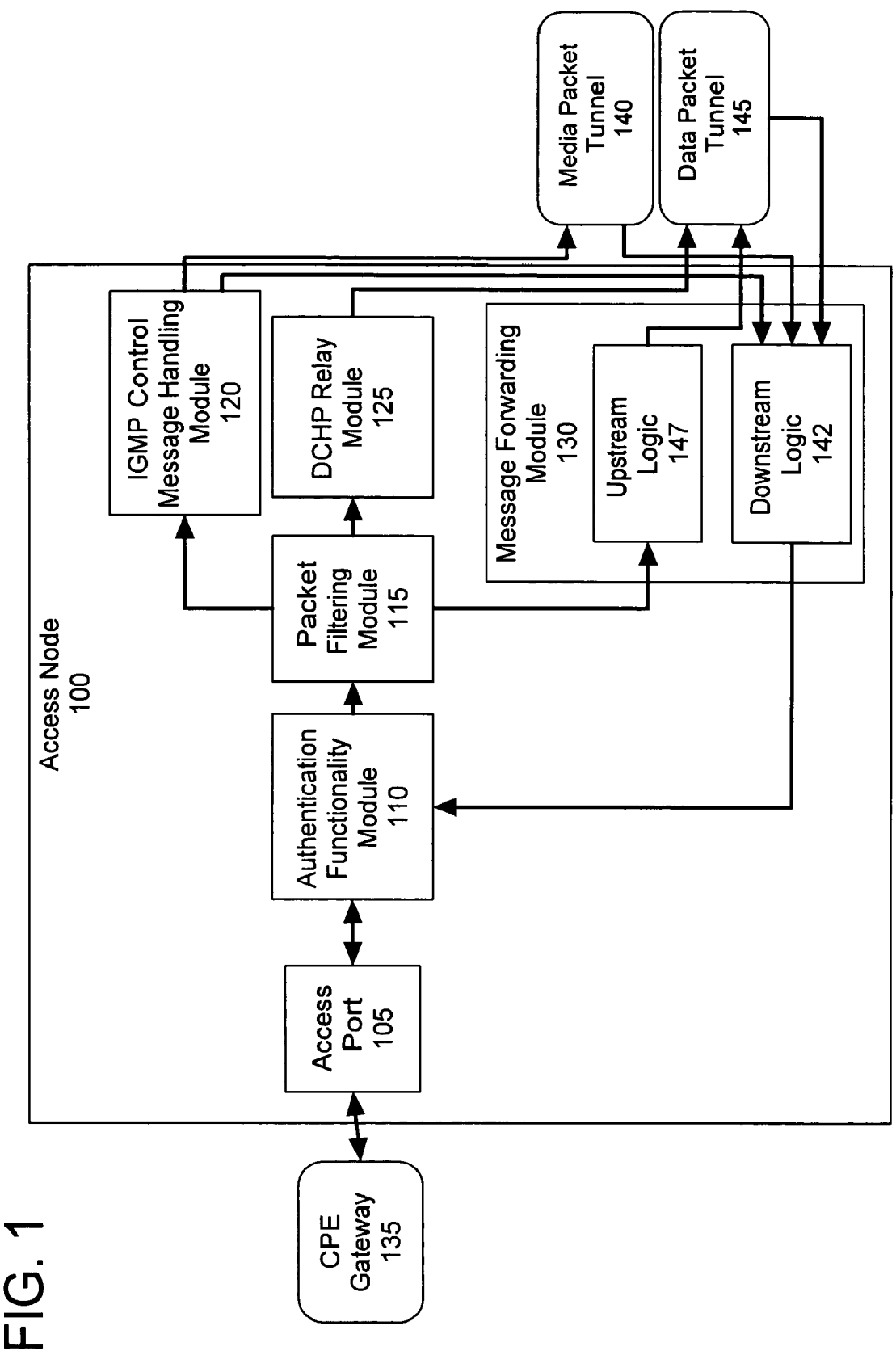
FIG. 1 depicts an embodiment of an access node in accordance with the present invention.

FIG. 1 depicts an embodiment of an access node in accordance with the present invention, which is referred to herein as the access node 100. The access node 100 includes an access port 105, an authentication functionality module 110, a packet filtering module 115, an IGMP control message handling module 120, a DCHP relay module 125 and a message forwarding module 130. As depicted in FIG. 1, the access port 105, the authentication functionality module 110, the filtering module 115, the IGMP control message handling module 120, the DCHP relay module 125 and the message forwarding module 130 are interconnected for enabling interaction therebetween. The authentication functionality module 110, the filtering module 115, the IGMP control message handling module 120, the DCHP relay module 125 and the message forwarding module 130 are examples of traffic management modules in accordance with the present invention.

The access port 105 is connected between a customer premise equipment (CPE) gateway 135 and the authentication functionality module 120. The CPE gateway 135 is a communication link extending between CPE and the access node 100. A media packet tunnel 140 (e.g., defined by a particular VLAN identifier) is connected to downstream logic 142 of the of the message forwarding module 130 and to the IGMP message handling module 120, thereby enabling media packets to be forwarded from the media packet tunnel 140 onto the CPE gateway via the access node 100. A data packet tunnel 145 (e.g., defined by a particular VLAN identifier) is connected to upstream logic 147 of the message forwarding module 130, to the downstream logic 142 and to the DCHP relay module 125, thereby enabling data packets to be forwarded from the data packet tunnel 145 onto the CPE gateway 135 via the access node 100 and from the CPE gateway 135 onto the data packet tunnel 145 via the access node 100.

The access port 105 is advantageously configured for operating in a semi-transparent mode. The semi-transparent mode provides for 1:1 mapping between a logical circuit on a network interface of the access node (e.g. a VLAN on a Ethernet network interface form the access node) and a logical circuit of the access port 105 (e.g., the first mile access loop of an access network). Downstream multicast traffic is exempt from 1:1 mapping. Examples of the logical circuit of the access loop include but are not limited to, Asynchronous Transfer Mode (ATM) Private Virtual Connection (PVC), a Digital Subscriber Line (DSL) port, a logical port on Gigabyte Passive Optical Network (GPON) and a Virtual Local Area Network (VLAN) identifier on Ethernet framed DSL technology.

Operating an access node in semi-transparent mode enables interfering in the packet stream allowing interception of key control plane messages or enforcing port level security policy while maintaining strict separation of the per-subscriber traffic. An example of control plane messages is IGMP query and membership report messages used to dynamically adjusting multicast forwarding tables. By intercepting IGMP messages, the access node can dynamically adjust multicast forwarding tables to perform packet replication in per subscriber logical circuits on an access loop between the access node and customer premise equipment (CPE) for multicast streams and hence achieving multicast efficiency in the access node. Intercepting key control plane message, enforcing port level security policy while keeping strict separation of the per-subscriber traffic, dynamically adjusting multicast forwarding tables in response to accessing Internet Group Message Protocol (IGMP) messages traversing the access port and dynamically adjusting multicast forwarding tables to perform packet replication in per subscriber logical circuits on an access loop between the access node and customer premise equipment (CPE) for multicast streams are examples of manipulating subscriber traffic for carrying out traffic management functionality.

The 1:1 mapping is an important aspect of the present invention in that an access node exhibiting such 1:1 mapping does not perform any logical aggregation of per-subscriber traffic. The node upstream (i.e., more centralised in the network) from the access node still sees subscriber traffic separated on an individual per-subscriber basis in a unique layer 2 tunnel (i.e., a VLAN). Typically, the point in the network where per-subscriber tunnels are terminated (e.g. by aggregating traffic from multiple subscriber in a single VLAN) is the point where subscriber management and advanced per-subscriber policies are enforced. By virtue of such 1:1 mapping, the access node is exempt from these advanced features.

Through the 1:1 mapping implemented in the semi-transparent mode, manipulation of subscriber traffic at the access port on a per-subscriber basis is provided for while maintaining logical separation of per-subscriber traffic. An access node configured in this manner enables an optimized architecture to provide for a variety of advantageous and useful traffic management functionality and is defined herein as providing for "intelligent cross connect". More specifically, an access node configured in accordance with the present invention provides for an architecture in which advanced per-subscriber policy functions are carried out at a more centralised point in the network while multicast efficiency, policy enforcement options and access node security policies are enabled at the access node. Examples of traffic management functionality include, but are not limited to, first mile logical circuit implementation of IEEE 802.1X port based authentication, IGMP control messages being snooped and/or redirected to an intelligent cross connect IGMP handler (e.g., proxy, Application Layer Gateway (ALG), etc), merging of downstream multicast traffic from multicast VLANs onto a subscriber' first mile logical circuit via VLAN multicast, DHCP messages being redirected to a DHCP handler, and application signalling protocols (e.g., SIP) being redirected to an ALG handler for policy enforcement.

As disclosed above, the authentication functionality module 110, the packet filtering module 115, the IGMP control message handling module 120, the DCHP relay module 125 and the message forwarding module 130 are examples of traffic management modules in accordance with the present invention. Through operation in a semi-transparent mode in accordance with the present invention and the associated 1:1 mapping, the access node 100 is able to carry out traffic management that conventionally cannot be carried out by an access node. Presented below is a brief overview of various preferred traffic management functionalities capable of being carried out by an access node configured in accordance with the present invention.

Port based network authentication may be implemented via the authentication functionality module 110 using the 802.1X standard (i.e., 802.1X) of the Institute of Electrical & Electronics Engineers (IEEE) and Extensible Authentication Protocol (EAP). In carrying out such authentication functionality, until a logical port is authenticated, the access port 105 is maintained in a "closed" state. In the closed state, only EAP messages are processed and forwarded to a local authenticator function, while all other traffic is dropped. After successful authentication for a specific user (e.g., a service subscriber), the logical port for that specific user is switched to an "open" state to allow access to the network. The authentication can be handled locally by an authenticator or can be proxied using EAP over RADIUS to a dedicated Remote Authentication Dial In User Service (RADIUS) server. When proxied, the full RADIUS client and specific Radius attributes such as NAS port identifier can be inserted as extra information for the backend RADIUS server are implemented.

In the upstream direction through the access node, the packet filtering module 115 redirects (proxies) or passes and redirects (snoops) IGMP messages to the IGMP control message handling module 120 (i.e., a IGMP handler) when the packet filter module 115 detects an upstream IGMP control message (e.g., group membership report message or group leave message). Downstream IGMP messages (e.g., queries) on the per-subscriber VLAN of the access node are always transparently forwarded. The IGMP control message handling module 120 terminates downstream IGMP messages on a multicast VLAN. The function of the IGMP control message handling module 120 is mainly to build and maintain the state of a multicast forwarding table based on the group membership reports and leave messages from a subscriber's logical port. This multicast forwarding table is used to replicate a multicast packet received on a multicast VLAN to all the current member ports.

On the control plane, the IGMP control message handling module 120 works in proxy mode or snooping mode (i.e., transparent or enhanced). In transparent snooping mode, the IGMP control message handling module 120 snoops IGMP messages only to add and remove entries in the multicast forwarding table and does not participate actively in the control plane. In enhanced snooping mode, the IGMP control message handling module 120 snoops IGMP messages to add and remove entries in the multicast forwarding table and only participates actively in the control plane when handling responses from downstream membership queries or generating downstream membership queries. In proxy mode, the IGMP control message handling module 120 behaves like a multicast router towards the subscriber and as a host towards the network. The IGMP proxy generates and sends IGMP membership reports and leave messages towards the network and implements a edge router IGMP query behavior towards subscriber equipment (i.e., via the CPE gateway 135).

The message forwarding module 130 matches a multicast group address in the multicast forwarding table created by the IGMP handler when a downstream multicast packet on an intelligent cross connect VLAN is received. If an entry for the multicast group exists, the packet is replicated and forwarded to all the member ports. On these ports, the multicast traffic is merged with downstream traffic from the intelligent cross connect VLAN onto a corresponding first mile logical circuit. If no matching multicast table entry exists, the packet is dropped.

All upstream and downstream DHCP messages are redirected to the DCHP relay module 125. By doing so, security policies such as the insertion of Option 82 type information in the upstream and removal of this information in the downstream is easily implemented. The DHCP relay module 125 is configured to insert or delete option 82 information and/or to operate as a full DHCP relay (e.g., in accordance with Request for Comments (RFC) 3046 of the Network Working Group).

Intelligent cross connect in accordance with the present invention is preferably tuned to an environment using DHCP IP address assignment and IP over Ethernet traffic encapsulation. This connectivity model may also be applied to PPP encapsulated traffic. In the PPP case, the IGMP function needs to snoop the IGMP messages from a PPP encapsulate frame and pass and redirect to the IGMP control message handling module 120. Downstream multicast efficiencies are obtained when the downstream multicast traffic is forwarded outside the PPP session. For the PPP control plane, a PPP handler can be added to the intelligent cross connect to add DHCP option 82 type information to the PPP over Ethernet Active Discovery Initiation (PADI) message, which is a function commonly referred to as a IGMP intermediate agent.

Presented now is a preferred embodiment of a method for facilitating intelligent cross connect functionality in accordance with the present invention. The method includes providing 1:1 between a logical circuit on a network interface of the access node and a logical circuit on an access loop between the access node and customer premise equipment (CPE). Providing 1:1 mapping includes associating a logical circuit identifier at the upstream network node with a logical circuit identifier at the access node thereby enabling a Layer 2 tunnel to be established. Subscriber traffic traverses the access node via the access loop. The method further includes performing traffic management functionality on the subscriber traffic in conjunction with the subscriber traffic traversing the access node. Examples of such traffic management functionality are disclosed above. The 1:1 mapping enables manipulation of subscriber traffic that is required for performing traffic management functionality on a per-subscriber basis.

Referring now to computer readable medium, it will be understood from the disclosures made herein that methods, processes and/or operations adapted for carrying out intelligent cross connect functionality in accordance with the present invention are tangibly embodied by computer readable medium having instructions thereon for carrying out such functionality. In one specific embodiment, the instructions are tangibly embodied for carrying out the method disclosed above. The instructions may be accessible by one or more data processing devices from a memory apparatus (e.g. RAM, ROM, virtual memory, hard drive memory, etc), from an apparatus readable by a drive unit of a data processing system (e.g., a diskette, a compact disk, a tape cartridge, etc) or both. Accordingly, embodiments of computer readable medium in accordance with the present invention include a compact disk, a hard drive, RAM or other type of storage apparatus that has imaged thereon a computer program (i.e., a set of instructions) adapted for carrying out intelligent cross connect functionality in accordance with the present invention.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. An access node, comprising:
    an access port located within the access node configured for operating in a semi-transparent mode, wherein the semi-transparent mode provides for 1:1 mapping between a logical circuit on a network interface of the access node and a logical circuit on an access loop between the access port and the customer premise equipment (CPE) thereby enabling manipulation of subscriber traffic at the access port on a per-subscriber basis while maintaining logical separation of per-subscriber traffic and wherein the semi-transparent mode enables interfering in packet stream for allowing interception of key control plane messages while maintaining strict separation of said per-subscriber traffic.

2. The access node of claim 1 wherein:
    the access port is configured for providing traffic management functionality; and
    said 1:1 mapping enables manipulation of subscriber traffic that is required for performing said traffic management functionality.

3. The access node of claim 1 wherein said manipulation of subscriber traffic includes accessing control plane messages traversing the access port.

4. The access node of claim 1 wherein said manipulation of subscriber traffic includes enforcing port level security.

5. The access node of claim 1 wherein said manipulation of subscriber traffic includes dynamically adjusting multicast forwarding tables in response to accessing Internet Group Message Protocol (IGMP) messages traversing the access port.

6. The access node of claim 5 wherein said manipulation of subscriber traffic includes performing packet replication in per subscriber logical circuits on an access loop between the access node and customer premise equipment (CPE) for multicast streams in conjunction with dynamically adjusting said multicast forwarding tables.

7. The access node of claim 6 wherein said manipulation of subscriber traffic includes:
    accessing control plane messages traversing the access port; and
    enforcing port level policy.

8. An access node, comprising:
    an access port located within the access node configured for operating in a semi-transparent mode;
    wherein the semi-transparent mode provides for 1:1 mapping between a logical circuit on a network interface of the access node and a logical circuit on an access loop between the access port and customer premise equipment (CPE);
    wherein the semi-transparent mode enables interfering in packet stream for allowing interception of key control plane messages while maintaining strict separation of subscriber traffic at the access node on a per-subscriber basis;
    wherein the access port is configured for providing traffic management functionality including at least one of subscriber authentication functionality, control message handling functionality, Dynamic Host Configuration Protocol (DHCP) message handling functionality, multicast group behavior functionality and Point-to-Point Protocol (PPP) message handling functionality; and
    wherein the 1:1 mapping enables manipulation of subscriber traffic that is required for implementing per subscriber traffic management functionality.

9. The access node of claim 8 wherein said traffic management functionality includes accessing control plane messages traversing the access port while maintaining strict logical separation of per-subscriber traffic.

10. The access node of claim 8 wherein said traffic management functionality includes enforcing port level policy while maintaining strict logical separation of per-subscriber traffic.

11. The access node of claim 8 wherein said traffic management functionality includes dynamically adjusting multicast forwarding tables in response to accessing Internet Group Message Protocol (IGMP) messages traversing the access port while maintaining strict logical separation of said per-subscriber traffic.

12. The access node of claim 11 wherein said traffic management functionality includes performing packet replication in per subscriber circuits on an access loop between the access node and customer premise equipment (CPE) for multicast streams in conjunction with dynamically adjusting said multicast forwarding tables.

13. The access node of claim 12 wherein said traffic management functionality includes:
    accessing control plane messages traversing the access port while maintaining strict logical separation of said per-subscriber traffic; and enforcing port level policy while maintaining strict logical separation of per-subscriber traffic.

14. A method comprising:

providing 1:1 mapping between a logical circuit on a network interface of an access node and a logical circuit on an access loop between an access port located within the access node and customer premise equipment (CPE), wherein subscriber traffic traverses the access loop, wherein said access port operates in semi-transparent mode that enables interfering in the packet stream for allowing interception of key control plane messages while maintaining strict separation of subscriber traffic at the access node on a per-subscriber basis; and performing traffic management functionality on said subscriber traffic in conjunction with said subscriber traffic traversing the access node via the access loop, wherein the 1:1 mapping enables manipulation of subscriber traffic that is required implementing per subscriber traffic management functionality.

15. The method of claim 14 wherein said providing 1:1 mapping includes associating a logical circuit identifier at the upstream network node with a logical circuit identifier at the access node access port thereby enabling a Layer 2 tunnel to be established.

16. The method of claim 14 wherein said performing traffic management functionality includes at least one of performing subscriber authentication functionality, performing control message handling functionality, performing Dynamic Host Configuration Protocol (DHCP) message handling functionality, performing multicast group behavior functionality and performing Point-to-Point Protocol (PPP) message handling functionality.

17. The method of claim 14 wherein said performing traffic functionality includes accessing control plane messages traversing the access port while maintaining strict logical separation of per-subscriber traffic.

18. The method of claim 14 wherein said performing traffic management functionality includes enforcing port level policy while maintaining strict logical separation of per-subscriber traffic.

19. The method of claim 14 wherein said performing traffic management functionality includes dynamically adjusting multicast forwarding tables in response to accessing Internet Group Message Protocol (IGMP) messages traversing the access port while maintaining strict logical separation of per-subscriber traffic.

20. The method of claim 19 wherein said performing traffic management functionality includes performing packet replication in per subscriber logical circuits on an access loop between the access node and customer premise equipment (CPE) for multicast streams in conjunction with dynamically adjusting said multicast forwarding tables.

* * * * *

UNITED STATES PATENT AND TRADEMARK OFFICE
CERTIFICATE OF CORRECTION

PATENT NO. : 7,646,713 B1 Page 1 of 1
APPLICATION NO. : 11/244969
DATED : January 12, 2010
INVENTOR(S) : Absillis et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 750 days.

Signed and Sealed this

Twenty-eighth Day of December, 2010

David J. Kappos
*Director of the United States Patent and Trademark Office*